US012181809B2

(12) United States Patent
Konishi

(10) Patent No.: US 12,181,809 B2
(45) Date of Patent: Dec. 31, 2024

(54) IMAGE FORMING APPARATUS

(71) Applicant: Takahiro Konishi, Tokyo (JP)

(72) Inventor: Takahiro Konishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/208,890

(22) Filed: Jun. 13, 2023

(65) Prior Publication Data

US 2024/0012347 A1 Jan. 11, 2024

(51) Int. Cl.
*G03G 15/16* (2006.01)
*G03G 21/16* (2006.01)

(52) U.S. Cl.
CPC ....... *G03G 15/1615* (2013.01); *G03G 15/165* (2013.01); *G03G 15/1655* (2013.01); *G03G 15/1665* (2013.01); *G03G 15/167* (2013.01); *G03G 15/1685* (2013.01); *G03G 21/1647* (2013.01); *G03G 21/168* (2013.01); *G03G 2215/00409* (2013.01); *G03G 2215/1619* (2013.01); *G03G 2215/1623* (2013.01)

(58) Field of Classification Search
CPC ............. G03G 15/1615; G03G 15/165; G03G 15/1655; G03G 15/1665; G03G 15/167; G03G 15/1685; G03G 21/1647; G03G 21/168; G03G 2215/00409; G03G 2215/1619; G03G 2215/1623
See application file for complete search history.

(56) References Cited

U.S. PATENT DOCUMENTS 5,963,240 A * 10/1999 Shinohara ................ B41J 2/471 347/116
2015/0050080 A1 2/2015 Morita et al.
2017/0010566 A1 1/2017 Kato et al.
2017/0168429 A1 6/2017 Imai et al.
2018/0059583 A1* 3/2018 Kumagai ........... G03G 15/1605
2020/0064765 A1 2/2020 Suga et al.
2020/0133172 A1 4/2020 Konishi et al.
2023/0090307 A1 3/2023 Konishi

FOREIGN PATENT DOCUMENTS

JP 2004-341087 12/2004
JP 2011-085906 4/2011
JP 2018-031999 3/2018

* cited by examiner

*Primary Examiner* — Joseph S Wong
(74) *Attorney, Agent, or Firm* — XSENSUS LLP

(57) ABSTRACT

An image forming apparatus includes a body, an intermediate transfer assembly, a secondary transfer assembly, and a drive motor. The intermediate transfer assembly is held by the body and includes an intermediate transferor. The secondary transfer assembly is held by the intermediate transfer assembly and includes a secondary transfer assembly and a cam. The secondary transferor assembly includes a secondary transferor rotatably held by the secondary transfer assembly. The secondary transferor presses the intermediate transferor. The cam contacts the secondary transferor assembly and adjusts a contact pressure of the secondary transferor against the intermediate transferor. The drive motor is held by the body and rotates the cam.

11 Claims, 7 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2022-109568, filed on Jul. 7, 2022, in the Japan Patent Office, the entire disclosure of which is hereby incorporated by reference herein.

BACKGROUND

Technical Field

Embodiments of the present disclosure relate to an image forming apparatus such as a copier, a printer, a facsimile machine, or a multifunction peripheral having at least two of copying, printing, and facsimile functions.

Related Art

One type of image forming apparatus such as a copier, a printer, or the like includes an intermediate transferor such as an intermediate transfer belt and a secondary transferor such as a secondary transfer belt to secondarily transfer an image formed on a surface of the intermediate transferor onto a sheet conveyed to a position of a secondary transfer nip.

SUMMARY

This specification describes an improved image forming apparatus that includes a body, an intermediate transfer assembly, a secondary transfer assembly, and a drive motor. The intermediate transfer assembly is held by the body and includes an intermediate transferor. The secondary transfer assembly is held by the intermediate transfer assembly and includes a secondary transfer assembly and a cam. The secondary transferor assembly includes a secondary transferor rotatably held by the secondary transfer assembly. The secondary transferor presses the intermediate transferor. The cam contacts the secondary transferor assembly and adjusts a contact pressure of the secondary transferor against the intermediate transferor. The drive motor is held by the body and rotates the cam.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
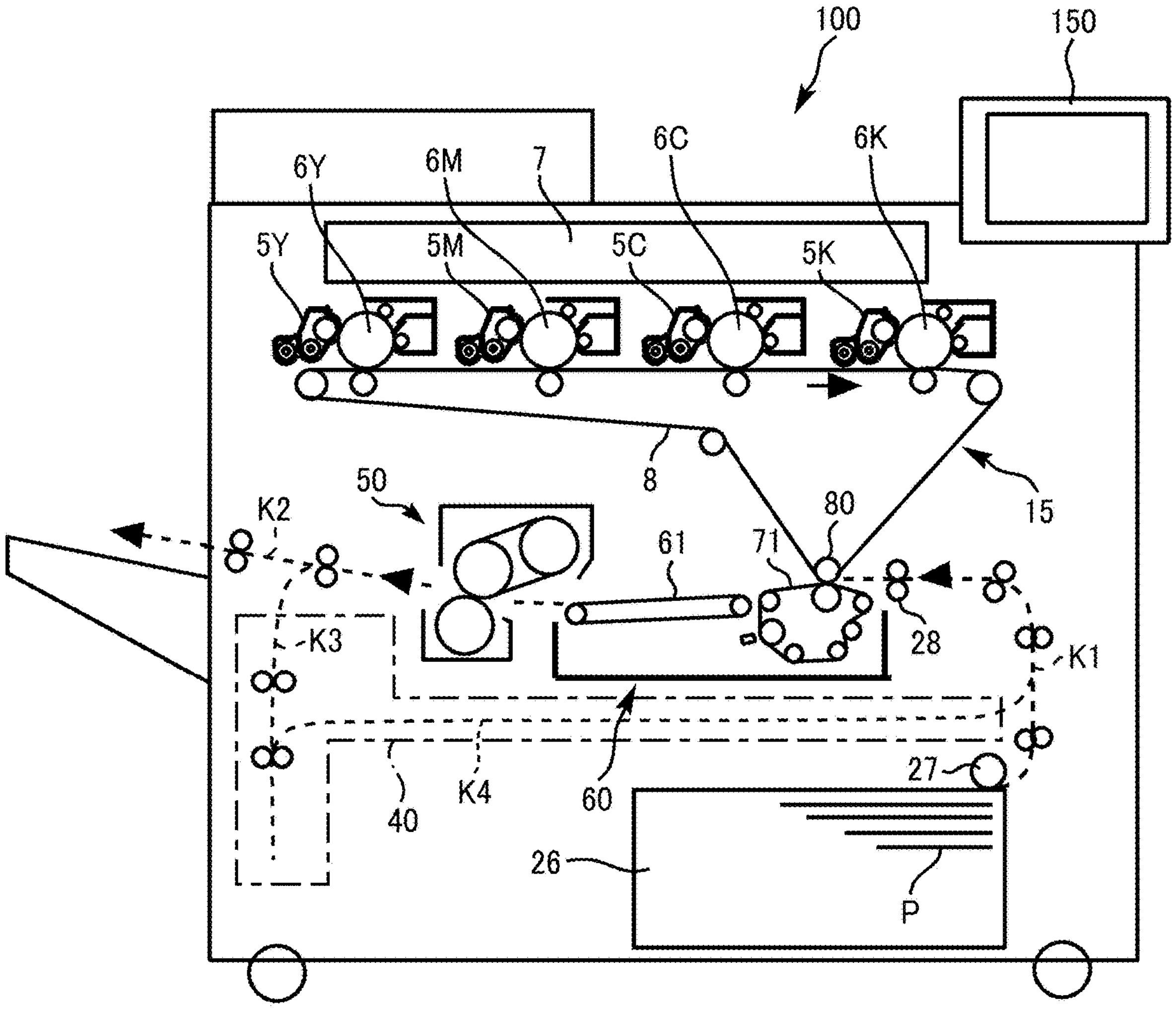
FIG. 1 is a schematic view of a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the drawings illustrating embodiments of the present disclosure, elements or components having identical or similar functions or shapes are given similar reference numerals as far as distinguishable, and redundant descriptions are omitted.

Figure 2:
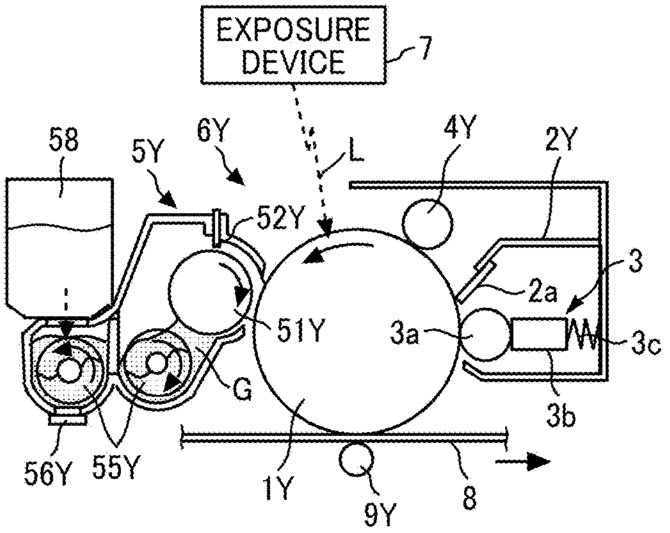
FIG. 2 is an enlarged view of a part of an image forming device and a block diagram of an exposure device in the image forming apparatus of FIG. 1.

With reference to FIGS. 1 and 2, a configuration and operation of an image forming apparatus 100 is described below.

FIG. 1 is a schematic view of the configuration of the image forming apparatus 100, which in the present embodiment is a printer. FIG. 2 is an enlarged view of a part of an image forming device and a block diagram of an exposure device in the image forming apparatus 100.

As illustrated in FIG. 1, the image forming apparatus 100 includes an intermediate transfer belt 8 as an intermediate transferor in a center of the image forming apparatus 100. The image forming apparatus 100 further includes image forming devices 6Y, 6M, 6C, and 6K disposed opposite the intermediate transfer belt 8 to form toner images of yellow, magenta, cyan, and black, respectively.

On an upper portion of the image forming apparatus 100, an operation display panel 150 is disposed. The operation display panel 150 displays information relating to printing operations (that is, image forming operations) and allows a user to perform operations relating to the printing operations.

Referring to FIG. 2, the image forming device 6Y that forms a yellow toner image includes a photoconductor drum 1Y as an image bearer. Around the photoconductor drum 1Y, the image forming device 6Y includes a charger 4Y, a developing device 5Y, a cleaning device 2Y, a lubricant supply device 3, and a discharger. A series of image forming processes including charging, exposure, developing, primary transfer, cleaning, and electrical discharge processes is performed on the photoconductor drum 1Y as the image bearer. Accordingly, a yellow image is formed on the surface of the photoconductor drum 1Y.

The other three image forming devices 6M, 6C, and 6K also have almost the same configuration as the image forming device 6Y corresponding to yellow, except a configuration that the toner colors used are different. Thus, only the image forming device 6Y is described below and descriptions of the other three image forming devices 6M, 6C, and 6K are appropriately omitted.

Referring to FIG. 2, the photoconductor drum 1Y as the image bearer is rotated counterclockwise by a main motor. The charger 4Y uniformly charges the surface of the photoconductor drum 1Y, which is referred to as the charging process.

The photoconductor drum 1Y is rotated further until reaching a position opposite to and facing an exposure device 7. The exposure device 7 irradiates the surface of the photoconductor drum 1Y with a laser beam L emitted from the exposure device 7 at this position and scans the surface of the photoconductor drum 1Y in a width direction (that is, a main scanning direction and a direction perpendicular to a surface of the paper plane on which each of FIGS. 1 and 2 is illustrated). By performing the above-described operation, the exposure device 7 forms an electrostatic latent image corresponding to the color of yellow on the surface of the photoconductor drum 1Y in the exposure process.

The exposure device 7 is a sealed case including a light source, a polygon motor, a group of mirrors, a group of lenses, a control board, electrical component parts, and the like.

After the electrostatic latent image is formed on the surface of the photoconductor drum 1Y, the photoconductor drum 1Y is rotated further and reaches a position facing the developing device 5Y. At the position, the developing device 5Y develops the electrostatic latent image into a visible toner image of yellow in the developing process.

Thereafter, the surface of the photoconductor drum 1Y reaches a position opposite a primary transfer roller 9Y and the intermediate transfer belt 8, and the toner image formed on the photoconductor drum 1Y is transferred to a surface of the intermediate transfer belt 8 at this position in the primary transfer process. After the primary transfer process, a certain amount of residual toner that is not transferred to the intermediate transfer belt 8 remains on the photoconductor drum 1Y.

When the surface of the photoconductor drum 1Y reaches a position facing the cleaning device 2Y, a cleaning blade 2*a* collects the residual toner from the photoconductor drum 1Y into the cleaning device 2Y in the cleaning process.

The cleaning device 2Y includes a lubricant supply roller 3*a*, a solid lubricant 3*b*, and a compression spring 3*c* as a pressing member, which constitute a lubricant supply device 3 for the photoconductor drum 1Y. The lubricant supply roller 3*a* rotating clockwise in FIG. 2 scrapes a small amount of lubricant from the solid lubricant 3*b* and applies the lubricant to the surface of the photoconductor drum 1Y.

Subsequently, the surface of the photoconductor drum 1Y reaches a position opposite the discharger, and the discharger eliminates a residual potential from the photoconductor drum 1Y.

Thus, a series of image forming processes performed on the surface of the photoconductor drum 1Y is completed.

The above-described image forming processes are performed in the image forming devices 6M, 6C, and 6K similarly to the image forming device 6Y for yellow. That is, the exposure device 7 disposed above the image forming devices 6M, 6C, and 6K irradiates the photoconductor drums 1M, 1C, and 1K of the image forming devices 6M, 6C, and 6K with the laser beams L based on image data. Specifically, in the exposure device 7, the light source emits the laser beams L, which are deflected by the polygon mirror rotated. The laser beams L then reach the photoconductor drums 1M, 1C, and 1K via multiple optical elements, respectively. Thus, the exposure device 7 scans the surface of each of the photoconductor drums 1M, 1C, and 1K with the laser beam L. Note that a plurality of light emitting diodes (LEDs) may be arranged side by side in the width direction as the exposure device 7.

Subsequently, developing devices 5M, 5C, and 5K develop electrostatic latent images into visible magenta, cyan, and black toner images, respectively, in the development process. The magenta, cyan, and black toner images respectively formed on the photoconductor drums 1M, 1C, and 1K are primarily transferred onto the intermediate transfer belt 8 such that the magenta, cyan, and black toner images are superimposed one atop another. Thus, a color toner image is formed on the intermediate transfer belt 8.

The intermediate transfer belt 8 as the intermediate transferor is entrained around and supported by multiple rollers 16 to 22 and 80. As the main motor drives and rotates a drive roller 16, the intermediate transfer belt 8 is rotated in a direction indicated by an arrow in FIG. 3.

Four primary transfer rollers 9Y, 9M, 9C, and 9K nip the intermediate transfer belt 8 together with the four photoconductor drums 1Y, 1M, 1C, and 1K to form the four primary transfer nips between the intermediate transfer belt 8 and the photoconductor drums 1Y, 1M, 1C, and 1K, respectively. A transfer voltage (i.e., a primary transfer bias) having a polarity opposite to a polarity of toner is applied to each of the primary transfer rollers 9Y, 9M, 9C, and 9K.

Figure 3:
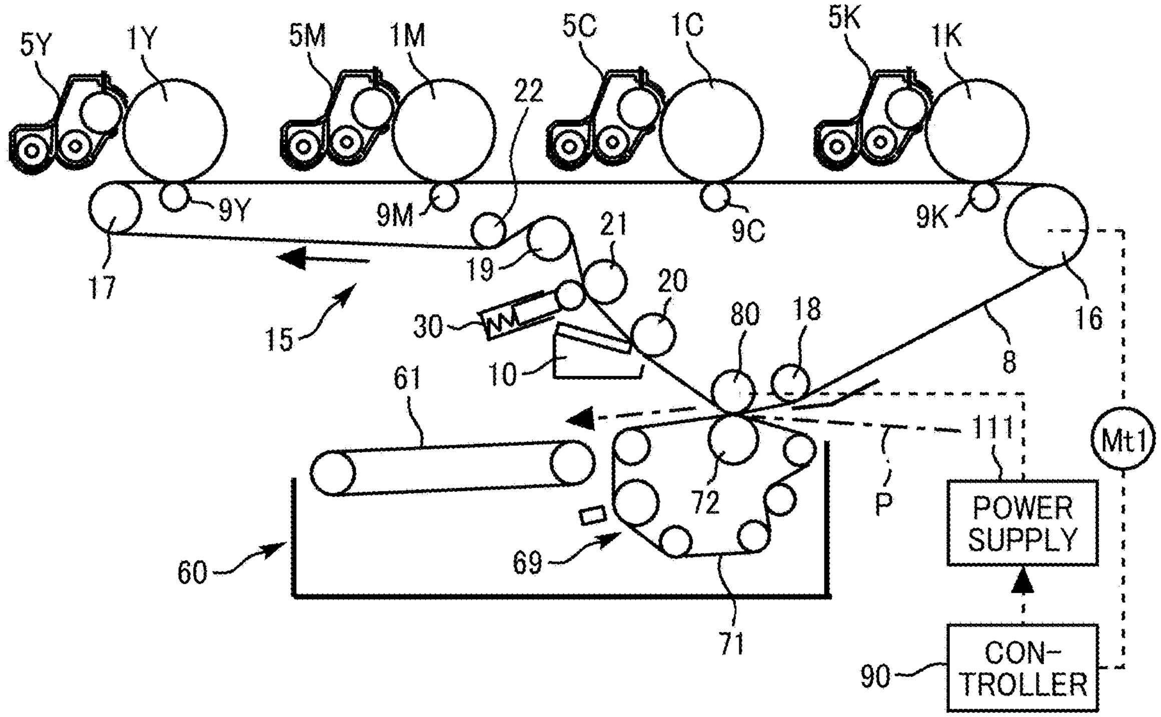
FIG. 3 is a schematic view of a configuration regarding an intermediate transfer belt and a secondary transfer belt device.

The intermediate transfer belt 8 travels in the direction indicated by the arrow in FIG. 3 and sequentially passes through the primary transfer nips formed by the four primary transfer rollers 9Y, 9M, 9C, and 9K. Thus, the toner images formed on the respective photoconductor drums 1Y, 1M, 1C, and 1K are primarily transferred onto the intermediate transfer belt 8 in a manner of being superimposed one atop another to form a composite color toner image on the intermediate transfer belt 8 in the primary transfer process.

Subsequently, the intermediate transfer belt 8 bearing the composite color toner image reaches a position opposite a secondary transfer belt 71 as a secondary transferor. At this position, the intermediate transfer belt 8 and the secondary transfer belt 71 are sandwiched by a secondary transfer roller 72 and a secondary transfer backup roller 80 to form a secondary transfer nip. At the secondary transfer nip, the composite color toner image that is four-color toner image including yellow, magenta, cyan, and black colors is secondarily transferred from the intermediate transfer belt 8 onto a sheet P serving as a recording medium conveyed to the position of the secondary transfer nip, in a secondary transfer process. At this time, residual toner that is not transferred onto the sheet P remains on the surface of the intermediate transfer belt 8.

After the secondary transfer process, the intermediate transfer belt 8 reaches a position opposite an intermediate transfer belt cleaner 10. At this position, the intermediate transfer belt cleaner 10 removes substances such as the residual toner adhering to the surface of the intermediate transfer belt 8.

Subsequently, the surface of the intermediate transfer belt 8 reaches a position facing a lubricant supply device 30 for the intermediate transfer belt 8. Lubricant is applied to the surface of the intermediate transfer belt 8 by the lubricant supply device 30 at the position.

Thus, a series of transfer processes performed on the surface of the intermediate transfer belt 8 is completed.

With reference to FIG. 1, the sheet P is conveyed from a sheet feeder 26 disposed in a lower portion of the body of the image forming apparatus 100 to the secondary transfer nip via a feed roller 27 and a registration roller pair 28.

Specifically, the sheet feeder 26 contains a stack of multiple sheets P such as sheets of paper stacked on one on another. The feed roller 27 is rotated counterclockwise in FIG. 1 to pick up and feed an uppermost sheet P of the multiple sheets P toward a portion between rollers of the registration roller pair 28 via a first sheet conveyance passage K1.

The registration roller pair 28 (a timing roller pair) temporarily stops rotating, stopping the sheet P with a leading edge of the sheet P nipped between the registration roller pair 28. Rotation of the registration roller pair 28 is timed to convey the sheet P toward the secondary transfer nip such that the sheet P meets the color toner image on the intermediate transfer belt 8 at the secondary transfer nip. Thus, the desired color toner image is transferred onto the sheet P.

The sheet P, onto which the color toner image is secondarily transferred at the secondary transfer nip, is conveyed on the secondary transfer belt 71 and separated from the secondary transfer belt 71, and then a conveyance belt 61 in a conveyor 60 conveys the sheet P to a fixing device 50. In the fixing device 50, a fixing belt and a pressure roller apply heat and pressure to the sheet P to fix the color toner image on the sheet P, which is referred to as a fixing process. The conveyor 60 includes multiple rollers, the conveyance belt 61 stretched and supported by the multiple rollers, and a conveyance guide plate.

The sheet P is conveyed through a second conveyance passage K2 and ejected by an ejection roller pair to the outside of the image forming apparatus 100. The sheets P ejected by the ejection roller pair to the outside of the image forming apparatus 100 are sequentially stacked as output images on a stack tray.

Thus, a series of image forming processes performed by the image forming apparatus 100 is completed.

In addition, the image forming apparatus 100 according to the present embodiment includes a duplex printing sheet conveyor 40 as illustrated in FIG. 1. The duplex printing sheet conveyor 40 conveys the sheet P toward the secondary transfer nip in order to transfer the color toner image on the intermediate transfer belt 8 to the back surface of the sheet P after the color toner image has been transferred to the front surface of the sheet P at the secondary transfer nip.

Specifically, in single-side printing mode, the sheet P is ejected after the toner image is fixed on the front side of the sheet P. By contrast, in duplex printing mode to form toner images on both sides (front side and back side) of the sheet P, the sheet P is guided to a third conveyance passage K3 in the duplex printing sheet conveyor 40. After a direction of conveyance of the sheet P is reversed, the sheet P is conveyed again to the secondary transfer nip in a secondary transfer assembly 69 via a fourth conveyance passage K4. Then, through the image forming processes (the printing operations) similar to those described above, the toner image is secondarily transferred onto the back side of the sheet P at the secondary transfer nip and fixed thereon by the fixing device 50. After the fixing process, the sheet P is ejected from the image forming apparatus 100 via the second conveyance passage K2.

Next, a detailed description is provided of a configuration and operations of the developing device 5Y in the image forming device 6Y with reference to FIG. 2.

The developing device 5Y includes a developing roller 51Y facing the photoconductor drum 1Y, a doctor blade 52Y facing the developing roller 51Y, two conveying screws 55Y disposed in developer containers, and a toner concentration sensor 56Y to detect concentration of toner in a developer G. The developing roller 51Y includes a stationary magnet, a sleeve that rotates around the magnet, and the like. The developer container contains the developer G, which is a two-component developer including carrier and toner.

The developing device 5Y configured as described above operates as follows.

The sleeve of the developing roller 51Y rotates in the direction indicated by an arrow in FIG. 2. The developer G held on the developing roller 51Y by the magnetic field generated by the magnet moves along the circumference of the developing roller 51Y as the sleeve rotates. A ratio of toner to the developer G (that is, a toner concentration) in the developing device 5Y is constantly adjusted within a predetermined range. Specifically, when low toner concentration is detected by the toner concentration sensor 56Y disposed in the developing device 5Y, fresh toner is supplied from a toner container 58 to the developing device 5Y to keep the toner concentration within the predetermined range.

The two conveying screws 55Y stir and mix the developer G with the toner supplied from the toner container 58 to the developer container while circulating the developer G in the two developer containers separated each other. In this case, the developer G moves in the direction perpendicular to the surface of the sheet on which FIG. 2 is drawn. The toner in developer G is charged by friction with carrier and electrostatically attracted to the carrier. Then, the toner is carried on the developing roller 51Y together with the carrier by a magnetic force generated on the developing roller 51Y.

The developer G bome on the developing roller 51Y is transported in the direction indicated by the arrow in FIG. 2 to the doctor blade 52Y. At this position, the doctor blade 52Y adjusts the amount of the developer G on the developing roller 51Y to an appropriate amount. Thereafter, the developer G on the developing roller 51Y is conveyed to a position opposite the photoconductor drum 1Y (i.e., a developing area). In the developing area, the toner is attracted to the latent image formed on the photoconductor drum 1Y by an electric field generated in the developing area. Thereafter, the developer G remaining on the developing roller 51Y is conveyed to an upper portion of the developer container along with rotation of the sleeve of the developing roller 51Y, where the developer G is separated from the developing roller 51Y.

The toner container 58 is detachably (that is, replaceably) attached on the developing device 5Y in the image forming apparatus 100. When the toner container 58 runs out of fresh toner, the toner container 58 is detached from the developing device 5Y (the image forming apparatus 100) and replaced with a new one.

Next, with reference to FIG. 3, a description is provided of an intermediate transfer assembly 15 according to the present embodiment.

With reference to FIG. 3, the intermediate transfer assembly 15 includes the intermediate transfer belt 8 as the intermediate transferor, the four primary transfer rollers 9Y, 9M, 9C, and 9K, the drive roller 16, a driven roller 17, a pre-transfer roller 18, a tension roller 19, a cleaning backup roller 20, a lubricant backup roller 21, a backup roller 22, the intermediate transfer belt cleaner 10, the lubricant supply device 30 for the intermediate transfer belt 8, the secondary transfer backup roller 80, and the like.

The intermediate transfer belt 8 as the intermediate transferor contacts four photoconductor drums 1Y, 1M, 1C, and 1K that bear toner images of respective colors to form primary transfer nips. The intermediate transfer belt 8 is stretched around and supported by eight rollers: the drive roller 16, the driven roller 17, the pre-transfer roller 18, the tension roller 19, the cleaning backup roller 20, the lubricant backup roller 21, the backup roller 22, and the secondary transfer backup roller 80.

According to the present embodiment, the intermediate transfer belt 8 is a single-layer or multi-layer belt formed with a material such as polyvinylidene fluoride (PVDF), ethylene tetrafluoroethylene (ETFE), polyimide (PI), and polycarbonate (PC), and a conductive material such as carbon black is dispersed therein. The volume resistivity of the intermediate transfer belt 8 is adjusted within a range of from $10^6$ to $10^{13}$ Ωcm, and the surface resistivity of the back surface of the intermediate transfer belt 8 is adjusted within a range of from $10^7$ to $10^{13}$ Ω/sq. The thickness of the intermediate transfer belt 8 ranges from 20 to 200 μm. According to the present embodiment, the intermediate transfer belt 8 has a thickness of about 60 μm, and a volume resistivity of about $10^9$ Ωcm.

The intermediate transfer belt 8 may include a release layer coated on the surface of the intermediate transfer belt 8 as needed. Examples of material usable for the release layer (coating) include, but are not limited to, fluoroplastic such as ETFE, polytetrafluoroethylene (PTFE), PVDF, perfluoroalkoxy polymer resin (PFA), tetrafluoroethylene-hexafluoropropylene copolymer (FEP), and polyvinyl fluoride (PVF).

The primary transfer rollers 9Y, 9M, 9C, and 9K are disposed in contact with the photoconductor drums 1Y, 1M, 1C, and 1K via the intermediate transfer belt 8, respectively. Specifically, the primary transfer roller 9Y for yellow contacts the photoconductor drum 1Y for yellow via the intermediate transfer belt 8. The primary transfer roller 9M for magenta contacts the photoconductor drum 1M for magenta via the intermediate transfer belt 8. The primary transfer roller 9C for cyan contacts the photoconductor drum 1C for cyan via the intermediate transfer belt 8. The primary transfer roller 9K for black contacts the photoconductor drum 1K for black via the intermediate transfer belt 8.

The drive roller 16 is disposed in contact with an inner circumferential surface of the intermediate transfer belt 8 by an angle of belt winding of about 120 degrees at a position downstream from the four photoconductor drums 1Y, 1M, 1C, and 1K in a direction of rotation of the intermediate transfer belt 8. A controller 90 as circuitry controls a motor Mt1 that rotates the drive roller 16 clockwise in FIG. 3. With such a configuration, the intermediate transfer belt 8 rotates in a predetermined direction (i.e., clockwise in FIG. 3).

The driven roller 17 is disposed in contact with the inner circumferential surface of the intermediate transfer belt 8 by the angle of belt winding of about 180 degrees at a position upstream from the four photoconductor drums 1Y, 1M, 1C, and 1K in the direction of rotation of the intermediate transfer belt 8. A portion of the intermediate transfer belt 8 extending from the driven roller 17 to the drive roller 16 via the four photoconductor drums 1Y, 1M, 1C, and 1K is substantially horizontal. The driven roller 17 is rotated clockwise in FIG. 3 as the intermediate transfer belt 8 rotates.

The tension roller 19 contacts the outer circumferential surface of the intermediate transfer belt 8. The pre-transfer roller 18, the cleaning backup roller 20, the lubricant backup roller 21, the backup roller 22, and the secondary transfer backup roller 80 contact the inner circumferential surface of the intermediate transfer belt 8.

Between the secondary transfer backup roller 80 and the lubricant backup roller 21, the intermediate transfer belt cleaner 10 including a cleaning blade is disposed so that the cleaning blade contacts the intermediate transfer belt 8 supported by the cleaning backup roller 20.

Between the cleaning backup roller 20 and the tension roller 19, the lubricant supply device 30 for the intermediate transfer belt 8 is disposed so that the lubricant supply device 30 contacts the intermediate transfer belt 8 supported by the lubricant backup roller 21. Similar to the lubricant supply device 3 for the photoconductor drum, the lubricant supply device 30 includes a lubricant supply roller, a solid lubricant, and a compression spring as a pressing member for the intermediate transfer belt 8. The lubricant supply roller rotating counterclockwise in FIG. 3 rubs a small amount of lubricant from the solid lubricant and applies the lubricant to the surface of the intermediate transfer belt 8.

The rollers 17 to 22 and 80 except the drive roller 16 are rotated clockwise in FIG. 3 by the rotation of the intermediate transfer belt 8.

Figure 4:
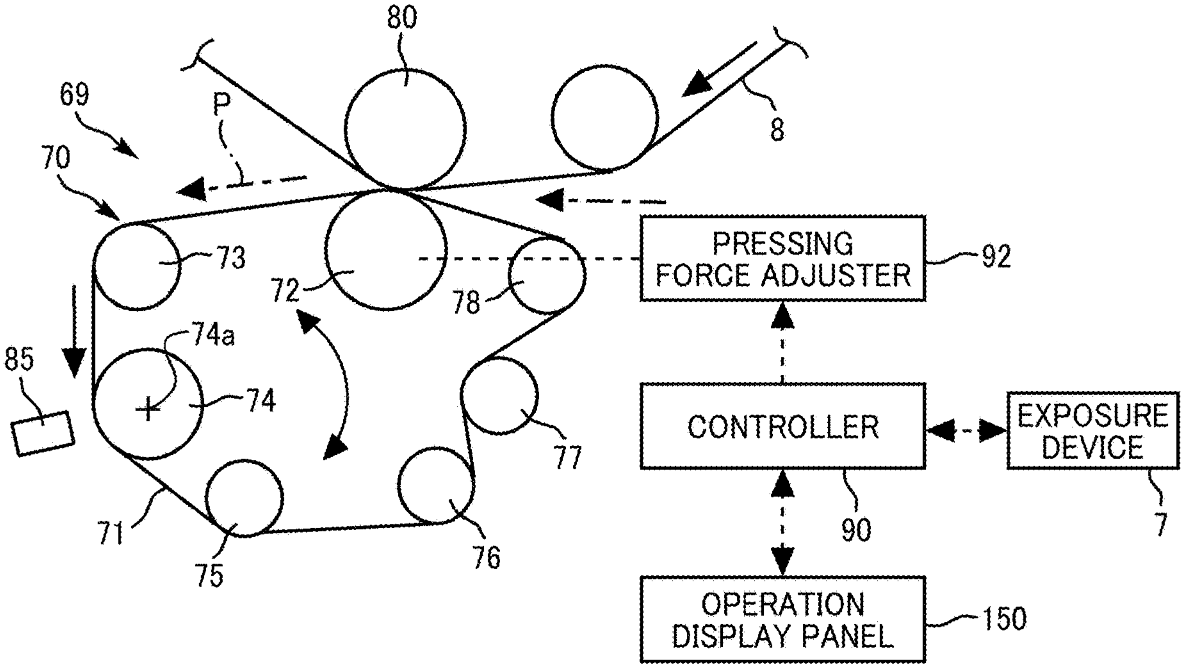
FIG. 4 is a schematic view of a configuration of the secondary transfer device and a block diagram that relates to the secondary transfer belt device.

With reference to FIG. 4, the secondary transfer backup roller 80 contacts the secondary transfer roller 72 in the secondary transfer assembly 69 via the intermediate transfer belt 8 and the secondary transfer belt 71. The secondary transfer backup roller 80 includes a cylindrical core made of, for example, stainless steel and the like and an elastic layer 83 on the outer circumferential face of the core. The elastic layer 83 is made of acrylonitrile-butadiene rubber (NBR). The elastic layer 83 has a volume resistivity ranging from approximately $10^7$ to $10^8$ Ωcm and a hardness ranging from approximately 48 to 58 degrees on Japanese Industrial Standards A hardness (JIS-A hardness) scale. The elastic layer 83 has a thickness of approximately 5 mm.

According to the present embodiment, the secondary transfer backup roller 80 is electrically coupled to a power supply 111 as a bias output device. The power supply 111 outputs a high voltage of −5 kV as a secondary transfer bias. With the secondary transfer bias applied to the secondary transfer backup roller 80, the toner image primarily transferred to the surface of the intermediate transfer belt 8 is secondarily transferred onto the sheet P transported to the secondary transfer nip. The secondary transfer bias has the same polarity as the polarity of toner. In the present embodiment, the secondary transfer bias is a direct current voltage in a negative polarity. The secondary transfer bias forms a secondary transfer electric field that electrostatically moves the toner bome on the outer circumferential surface (a toner bearing surface) of the intermediate transfer belt 8 in a direction from the secondary transfer backup roller 80 toward the secondary transfer roller 72 in the secondary transfer assembly 69.

The following describes the secondary transfer assembly 69 with reference to FIG. 4.

As illustrated in FIG. 4, the secondary transfer assembly 69 is disposed so as to face the intermediate transfer belt 8 of the intermediate transfer assembly 15.

The secondary transfer assembly 69 includes a secondary transfer belt assembly 70, a pressing force adjuster 92 (in other words, a pressing sub-unit), optical sensors 85, and the like. The secondary transfer belt assembly 70 as a secondary transferor assembly includes a secondary transfer belt 71 serving as the secondary transferor, the secondary transfer roller 72, a separation roller 73, a sensor facing roller 74, a first tension roller 75, a second tension roller 76, a third tension roller 77, and a fourth tension roller 78.

The secondary transfer belt 71 is an endless belt stretched around and supported by seven rollers (i.e., the secondary transfer roller 72, the separation roller 73, the sensor facing roller 74, the first to fourth tension rollers 75 to 78). The secondary transfer belt 71 is made of a material similar to that of the intermediate transfer belt 8. The secondary transfer belt 71 as the belt contacts the intermediate transfer belt 8 as the intermediate transferor to form the secondary transfer nip as a transfer nip and conveys the sheet P sent out from the secondary transfer nip.

The intermediate transfer belt 8 and the secondary transfer belt 71 are sandwiched by the secondary transfer roller 72 and the secondary transfer backup roller 80 to form the secondary transfer nip. The secondary transfer roller 72 includes a hollow tubular core made of, for example, stainless steel, aluminum, or the like and an elastic layer coated on the core. The elastic layer has a hardness ranging from approximately 40 to 50 degrees on Asker C hardness scale. The elastic layer of the secondary transfer roller 72 made of a rubber material, such as polyurethane, ethylene-propylene-diene monomer (EPDM), and silicone and has a solid or foam sponge state. A conductive filler, such as carbon, is dispersed in the rubber material. Alternatively, an ionic conductive material is included in the rubber material. According to the present embodiment, the elastic layer of the secondary transfer roller 72 has a volume resistivity ranging from $10^{6.5}$ to $10^{7.5}$ Ωcm to prevent concentration of a transfer current. In the present embodiment, the secondary transfer roller 72 is electrically grounded.

A motor controlled by the controller 90 drives and rotates the secondary transfer roller 72 counterclockwise in FIG. 4 to rotate (run) the secondary transfer belt 71 counterclockwise in FIGS. 3 and 4. The rotation of the secondary transfer belt 71 rotates the multiple rollers 73 to 78 contacting the inner circumferential surface (or the outer circumferential surface) of the secondary transfer belt 71.

The separation roller 73 is disposed downstream from the secondary transfer nip in the direction of conveyance of the sheet P. Ejected from the secondary transfer nip, the sheet P is transported along the secondary transfer belt 71 rotating counterclockwise in FIG. 4 and separated from the secondary transfer belt 71 at a curved portion of the secondary transfer belt 71 wound around a circumference of the separation roller 73 by self-stripping.

The sensor facing roller 74 faces the optical sensors 85 via the secondary transfer belt 71, which will be described in detail later.

In the present embodiment, the secondary transfer belt 71 is stretched around and supported by the seven rollers 72 to 78, and the third tension roller 77 contacts the outer circumferential surface of the secondary transfer belt 71. However, a number of rollers supporting the secondary transfer belt 71 stretched around the rollers, a number of rollers contacting the outer circumferential surface of the secondary transfer belt 71, and positions of the rollers are not limited to those in the present embodiment.

Next, a detailed description is provided of a configuration and operations of the secondary transfer assembly 69 with reference to FIGS. 4 to 7.

As described above, the secondary transfer assembly 69 in the present embodiment includes the secondary transfer belt assembly 70 as the belt assembly, the pressing force adjuster 92 as the pressing sub-unit, the optical sensors 85, and the like.

As illustrated in FIG. 4, the secondary transfer belt assembly 70 includes multiple rollers (that are seven rollers, i.e., the secondary transfer roller 72, the separation roller 73, the sensor facing roller 74, the first to fourth tension rollers 75 to 78) and the secondary transfer belt 71 as the secondary transferor stretched around by the multiple rollers 72 to 78.

The secondary transfer belt 71 serving as the belt is pressed against the secondary transfer backup roller 80 via the intermediate transfer belt 8 serving as the intermediate transferor.

Figure 5A:
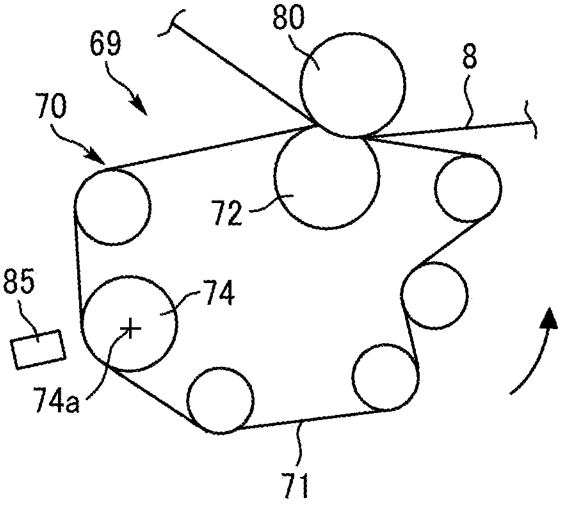
FIG. 5A is a schematic view of a secondary transfer belt assembly after the secondary transfer belt assembly is rotated to the intermediate transfer belt.
Figure 5B:
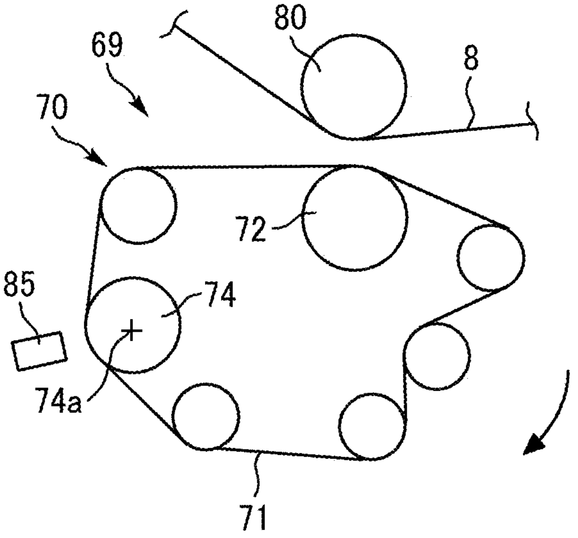
FIG. 5B is a schematic view of the secondary transfer belt assembly after the secondary transfer belt assembly is rotated away from the intermediate transfer belt.
Figure 6:
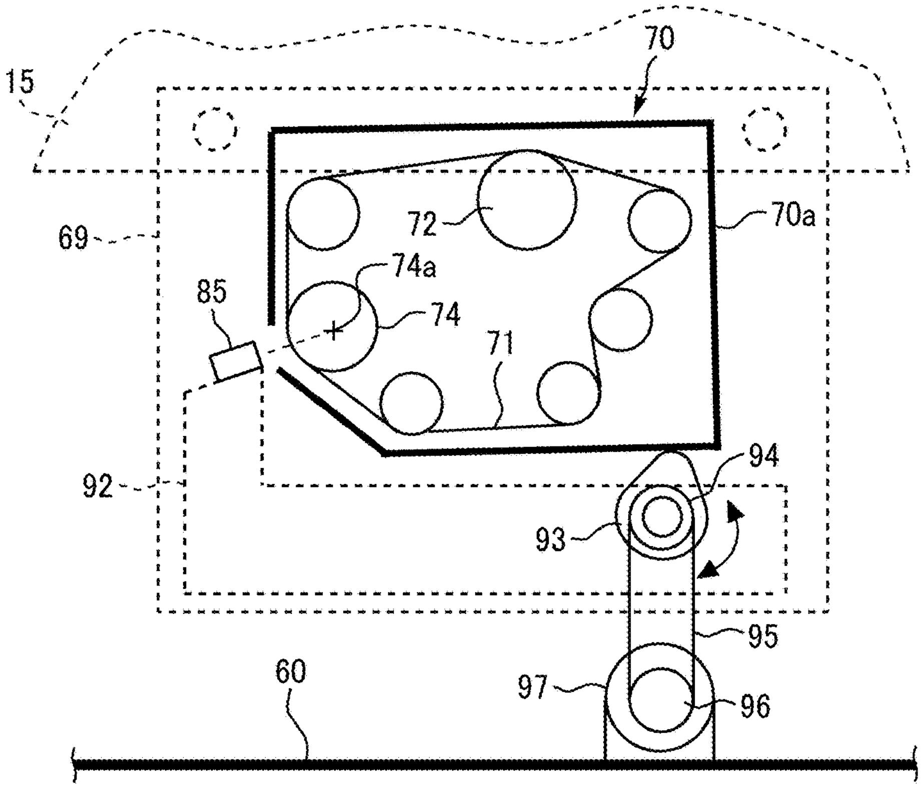
FIG. 6 is a schematic view of a configuration of a secondary transfer assembly and parts around the secondary transfer assembly.

With reference to FIGS. 4 to 6, the secondary transfer belt assembly 70 is configured to be rotatable (in other words, swingable) about a rotation axis **74*a* of the sensor facing roller 74 that is one of the multiple rollers 72 to 78. The rotation axis is a rotation center of rotation of the sensor facing roller 74**.

As described above, the secondary transfer roller 72 is pressed against the intermediate transfer belt 8 via the secondary transfer belt 71. The secondary transfer roller 72 is another of multiple rollers 72 to 78 and different from the sensor facing roller 74 that is the one of the multiple rollers 72 to 78.

The pressing force adjuster 92 as the pressing sub-unit rotates the secondary transfer belt assembly 70 about the rotation axis **74*a* (that is the rotation axis of the sensor facing roller 74) to adjust a contact pressure of the secondary transfer belt 71 that is pressed against the intermediate transfer belt 8** as the intermediate transferor. The contact pressure is also referred to as a nip pressure or a secondary transfer nip pressure.

Specifically, with reference to FIG. 6, the pressing force adjuster 92 includes a cam 93 contacting the bottom of a unit case **70*a* of the secondary transfer belt assembly 70. In the present embodiment, a drive motor 97 to drive and rotate the cam 93 is disposed on the conveyor 60 in the image forming apparatus 100 and not disposed on the secondary transfer assembly 69**, which is described in detail below.

Bearings are assembled to the unit case **70*a* and rotatably hold the seven rollers 72 to 78, and a motor is fixed on the unit case 70*a* and drives and rotates the secondary transfer roller 72**.

The controller 90 controls the drive motor 97 to rotate the cam 93 so that a posture of the cam 93 becomes a target posture that is a posture in the rotation direction (in other words, so that the cam 93 rotates until a rotation amount of the cam 93 becomes a target value) to adjust the contact pressure (that is the nip pressure in the secondary transfer nip) of the secondary transfer belt 71 (and the secondary transfer roller 72) that is pressed against the intermediate transfer belt 8 (and the secondary transfer backup roller 80).

Specifically, as illustrated in FIG. 5A, the pressing force adjuster 92 rotates the secondary transfer belt assembly 70 counterclockwise about the rotation axis 74*a* to increase the nip pressure in the secondary transfer nip. In contrast, as illustrated in FIG. 5B, the pressing force adjuster 92 rotates the secondary transfer belt assembly 70 about the rotation axis 74*a* clockwise to decrease the nip pressure in the secondary transfer nip.

A state in which the nip pressure in the secondary transfer nip becomes small includes a state in which the secondary transfer belt 71 is completely separated from the intermediate transfer belt 8 as illustrated in FIG. 5B so that the nip pressure becomes 0.

More specifically, the controller 90 in the present embodiment controls the pressing force adjuster 92 so as to press a thick sheet P conveyed to the secondary transfer nip and passing through the secondary transfer nip at a smaller nip pressure than that of a thin sheet. As a result, regardless of the thickness of the sheet P, good conveying performance of the sheet P at the secondary transfer nip is ensured.

In addition, the controller 90 controls the pressing force adjuster 92 so that the pressing force adjuster 92 presses a sheet P, to which the toner image is not easily transferred, with a larger nip pressure in the secondary transfer nip than a sheet to which the toner image is easily transferred. As a result, regardless of the type of the sheet P, good transfer performance at the secondary transfer nip is ensured.

In addition, the controller 90 controls the pressing force adjuster 92 so that the nip pressure in the secondary transfer nip for the sheet P, to which the toner image having a small image area rate is secondarily transferred, is smaller than that for a sheet bearing the toner image having a large image area rate. The image area rate is a rate of the image area to an effective image area. The above-described control ensures stable transfer performance at the secondary transfer nip regardless of the image area rate.

Data relating to the thickness and the type of the sheet P is input to the operation display panel 150 by a user. The user operates the operation panel display to input the data. The controller 90 acquires the input data. The controller 90 acquires the image area rate based on the image data used by the exposure device 7.

The pressing force adjuster 92 in the present embodiment is configured to completely separate the secondary transfer belt 71 from the intermediate transfer belt 8 as illustrated in FIG. 5B.

When the image forming apparatus 100 does not perform the printing operations (in other words, the image forming processes), for example, after turning off the main power of the image forming apparatus, or after stopping the printing operations, the controller 90 controls the pressing force adjuster 92 so as to completely separate the secondary transfer belt 71 from the intermediate transfer belt 8. If the intermediate transfer belt 8 and the secondary transfer belt 71 always come into pressure contact with each other, elastic distortion may occur. The above-described control can reduce a disadvantage of the elastic distortion.

As illustrated in FIGS. 4 to 6, the optical sensor 85 in the present embodiment is fixed on the secondary transfer assembly 69 so as to face the sensor facing roller 74 via the secondary transfer belt 71. The sensor facing roller 74 has the rotation center of rotation of the secondary transfer belt assembly 70 The optical sensor 85 is not interlocked with the rotation of the secondary transfer belt assembly 70 that is rotated by the pressing force adjuster 92.

Specifically, the optical sensor 85 is a reflective photosensor including a light-emitting element and a light-receiving element that are disposed so as to face the outer circumferential surface of the secondary transfer belt 71. The optical sensors 85 are fixed to the pressing force adjuster 92 as illustrated in FIG. 6. That is, the optical sensors 85 are not fixed to the secondary transfer belt assembly 70 but are fixed to the pressing force adjuster 92 that does not move in conjunction with the rotation of the secondary transfer belt assembly 70.

In the present embodiment, the above-described image forming processes form an image pattern (that is, a toner image for image adjustment) on the intermediate transfer belt 8 at a timing different from the timing for printing the toner image on the sheet P such as a timing before printing or a timing between forming the images printed on the sheets. The image pattern is not transferred to the sheet P. The image pattern is secondarily transferred to the secondary transfer belt 71. The optical sensors 85 optically detect the image pattern (or background portion). Based on results detected by the optical sensors 85 as described above, the controller 90 adjusts various conditions regarding the secondary transfer process such as the secondary transfer bias, the nip pressure in the secondary transfer nip, and the rotation speed of the secondary transfer roller 72 and a timing at which the exposure device 7 irradiates the photoconductor drums 1Y, 1M, 1C, and 1K with the laser beams L. As a result, the above-described control optimizes the transfer efficiency in the secondary transfer process (as a result, an image density is optimized) and reduces the displacement of the image secondarily transferred.

The position of the optical sensor 85 in the width direction that is a main scanning direction is set so as to coincide with the position of the image pattern irradiated by the exposure device 7 in the width direction (that is, a writing position in the main scanning direction) (so as to detect the image pattern).

As described above, the optical sensor 85 in the present embodiment is disposed so as to face the roller (that is, the sensor facing roller 74) having the rotation axis 74*a* of the rotation of the secondary transfer belt assembly 70 and is fixed so as not to move in conjunction with the rotation of the secondary transfer belt assembly 70. The above-described structure is less likely vary detection accuracy of the optical sensor 85 that detects the image or the background portion on the surface of the secondary transfer belt 71 even when the secondary transfer belt 71 in the secondary transfer belt assembly 70 is rotated, and the size and cost of the secondary transfer assembly 69 are less likely to increase.

In the present embodiment, multiple optical sensors 85 are arranged at intervals along the axial direction of the sensor facing roller 74 that is defined by the rotation axis 74*a*. The axial direction is the lateral direction in FIG. 7.

The above-described configuration enables the multiple optical sensors 85 to detect image patterns (or background portions) formed on the secondary transfer belt 71 and arranged along the axial direction of the sensor facing roller 74 at the time of adjusting the various conditions for the secondary transfer process and the timing at which the exposure device 7 irradiates the photoconductor drums 1Y, 1M, 1C, and 1K with the laser beams L as described above. Based on the results detected by the multiple optical sensors 85, the controller 90 can accurately adjust various conditions over the axial direction, that is, conditions for the secondary transfer process and the timing at which the exposure device 7 irradiates the photoconductor drums 1Y, 1M, 1C, and 1K with the laser beams L.

With reference to FIGS. 6 to 9B, the following describes a configuration and operations of the image forming apparatus 100 according to the present embodiment in detail.

Figure 8A:
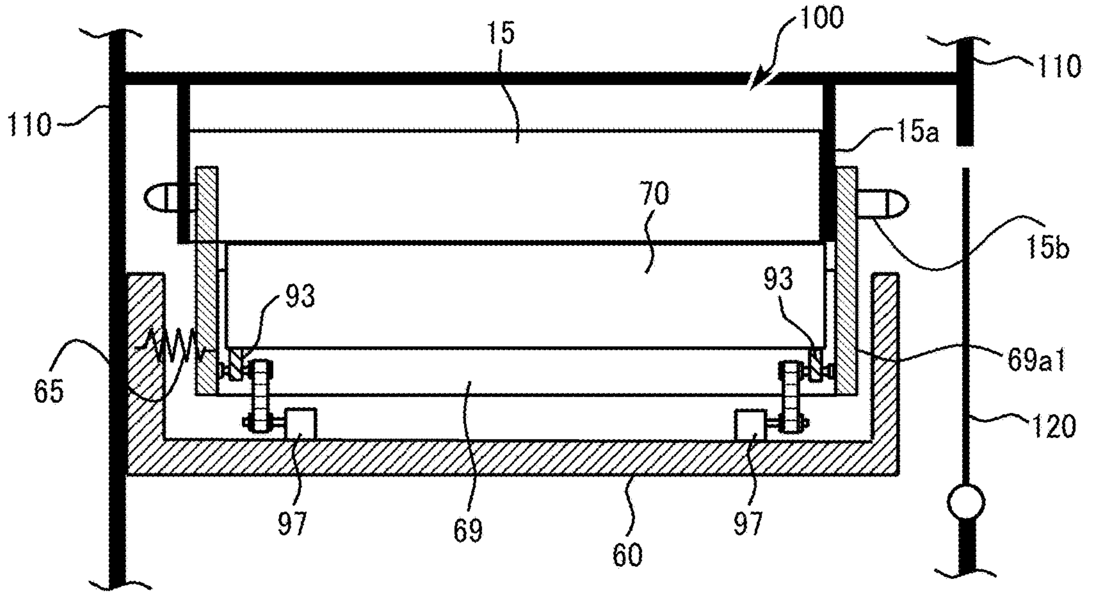
FIG. 8A is a schematic view of the secondary transfer assembly housed in a body of the image forming apparatus.

As described above, the image forming apparatus 100 according to the present embodiment includes the intermediate transfer assembly 15, the secondary transfer assembly 69, and the conveyor 60 (see FIGS. 6 and 8A).

The intermediate transfer assembly 15 includes the intermediate transfer belt 8 as the intermediate transferor onto which the image (that is, the toner image) formed on the surface of the photoconductor drum 1Y as the image bearer are primarily transferred.

The intermediate transfer assembly 15 is held by the body of the image forming apparatus 100. Specifically, the intermediate transfer assembly 15 in the present embodiment is fixed and positioned by screw fastening or the like to side plates of the image forming apparatus 100.

The intermediate transfer assembly 15 holds the secondary transfer assembly 69, and the secondary transfer assembly 69 holds the secondary transfer belt assembly 70 so that the secondary transfer belt assembly 70 can rotate in the secondary transfer assembly 69. The secondary transfer assembly 69 includes the cam 93 contacting the secondary transfer belt assembly 70 to adjust the contact pressure of the secondary transfer belt 71 as the secondary transferor that is pressed against the intermediate transfer belt 8 as the intermediate transferor. The secondary transfer assembly 69 is held so as to be attachable to and detachable from the intermediate transfer assembly 15 held in the body of the image forming apparatus 100.

The secondary transfer belt assembly 70 includes the secondary transfer belt 71 as the secondary transferor to secondarily transfer the image (that is, the toner image) on the surface of the intermediate transfer belt 8 to the sheet P conveyed to the secondary transfer nip between the intermediate transfer belt 8 and the secondary transfer belt 71.

Figure 9A:
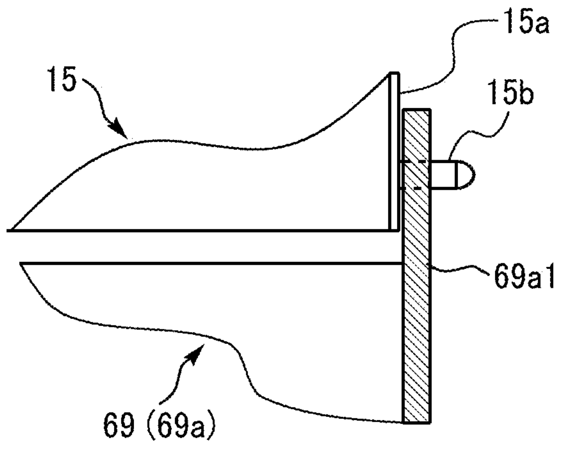
FIG. 9A is a side view of a positioning pin of an intermediate transfer assembly inserted into and fitted to the secondary transfer assembly.
Figure 9B:
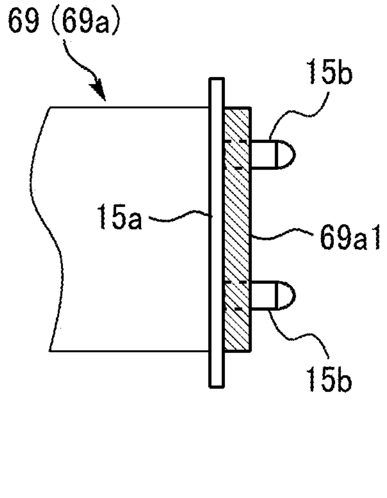
FIG. 9B is a top view of the positioning pin of the intermediate transfer assembly inserted into and fitted to the secondary transfer assembly.

The conveyor 60 includes the conveyance belt 61 (see FIGS. 1 and 3) to convey the sheet P in a predetermined conveyance direction that is a direction perpendicular to the paper surface in FIGS. 8A and 9A, and a vertical direction in FIG. 9B.

Figure 8B:
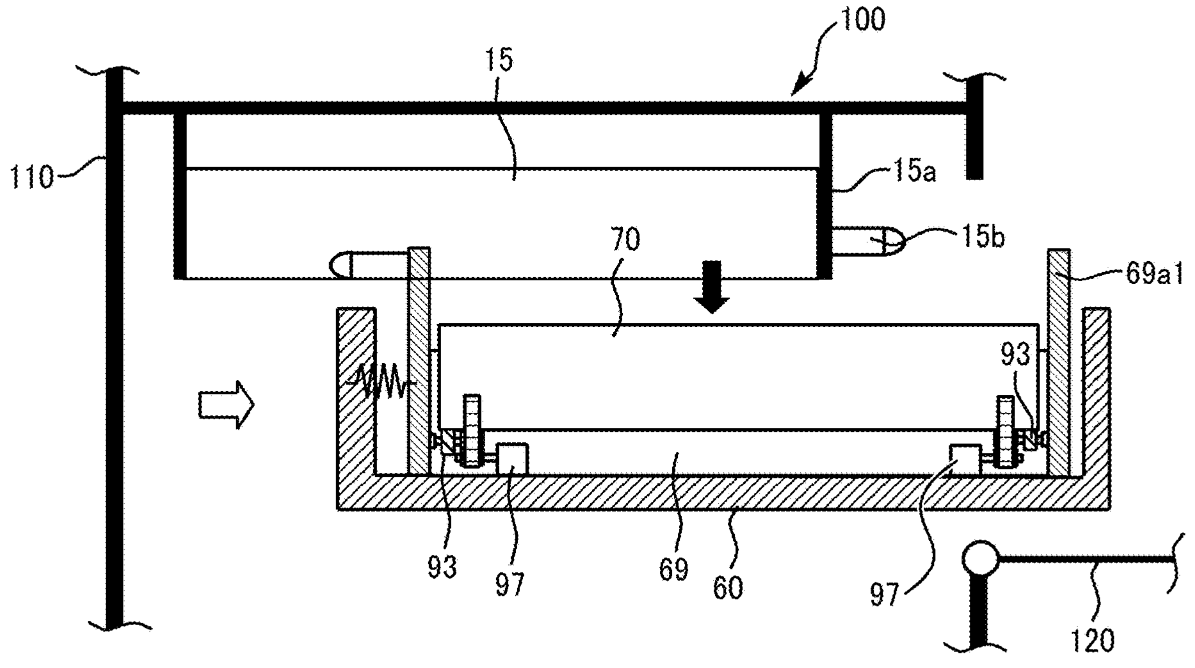
FIG. 8B is a schematic view of the secondary transfer assembly pulled out of the body of the image forming apparatus.

As illustrated in FIGS. 8A and 8B, the conveyor 60 in the present embodiment can be pulled out from the body of the image forming apparatus 100 in the width direction that is the direction perpendicular to the conveyance direction and the rightward direction in FIGS. 8A and 8B while holding the secondary transfer assembly 69 separated from the intermediate transfer assembly 15 held by the body of the image forming apparatus 100.

Specifically, the conveyor 60 is held on sliders attached to the body of the image forming apparatus 100 so as to be movable in the lateral direction in FIG. 8. As illustrated in FIG. 8A, the conveyor 60 holding the secondary transfer assembly 69 is installed in the body of the image forming apparatus 100 and, as illustrated in FIG. 8B, can be pulled out of the body of the image forming apparatus 100 in a direction indicated by a white arrow.

In this specification, the state in which the conveyor 60 can be "pulled out" from the body of the image forming apparatus 100 is defined to include not only a state in which the conveyor 60 can be pulled out so that only a part of the conveyor 60 is exposed to the outside of the image forming apparatus 100 but also a state in which the conveyor 60 is completely detached from the image forming apparatus 100.

As illustrated in FIGS. 8A and 8B, a user pulls out the conveyor 60 including the secondary transfer assembly 69 from the body of the image forming apparatus 100. Specifically, the user opens a door 120 on the front side of the image forming apparatus 100 and grips a handle on the front side of the conveyor 60 to pull out the conveyor 60. The user sets the conveyor 60 pulled out (and the secondary transfer assembly 69) in the body of the image forming apparatus 100 in reverse procedure of pulling-out the conveyor 60.

The user performs the above-described operations, for example, when the user removes the sheet P jammed in the conveyor 60. In particular, pulling out the conveyor 60 including the secondary transfer assembly 69 from the image forming apparatus in the present embodiment enables easily removing the sheet P jammed at the secondary transfer nip.

In the present embodiment, the exposure device 7 and the intermediate transfer assembly 15 are fixed in the body of the image forming apparatus 100 by screw fastening. The exposure device 7 and the intermediate transfer assembly 15 are not configured to be drawn out.

With reference to FIG. 8A, after the conveyor 60 is set in the body of the image forming apparatus 100, the secondary transfer assembly 69 in the present embodiment is directly set to the intermediate transfer assembly 15, which determines a position of the secondary transfer assembly 69 with respect to the intermediate transfer assembly 15 in the width direction of the secondary transfer assembly 69. However, setting the conveyor 60 in the body of the image forming apparatus 100 does not determine the position of the secondary transfer assembly with respect to the conveyor 60.

Specifically, a contact surface on a face plate 69*a*1 of the secondary transfer assembly 69 contacts a reference surface on a reference plate 15*a* of the intermediate transfer assembly 15, which determines the position of the secondary transfer assembly 69 with respect to the intermediate transfer assembly 15 in the width direction of the secondary transfer assembly 69.

More specifically, as illustrated in FIG. 8A, the secondary transfer assembly 69 is not fixed to the conveyor 60 set to the body of the image forming apparatus 100. The secondary transfer assembly 69 above the bottom of the conveyor 60 is movable to some extent in the width direction. In other words, the secondary transfer assembly 69 is in an upward floating state or a non-held state. The body of the image forming apparatus 100 includes a guide that loosely holds the secondary transfer assembly 69 in the floating state with respect to the conveyor 60 attached to the body of the image forming apparatus 100 so that the secondary transfer assembly 69 is movable in the width direction.

In addition, the secondary transfer assembly 69 includes the face plate 69*a*1 disposed on a front side of a unit case 69*a* (in other words, an edge face of one end of the unit case 69*a*) (see FIG. 9). The face plate 69*a*1 projects toward the intermediate transfer assembly 15 in a direction orthogonal to the width direction and the conveyance direction. The face plate 69*a*1 has the contact surface. Bringing the contact surface of the face plate 69*al* disposed on the unit case 69*a* of the secondary transfer assembly 69 into contact with the reference surface of the reference plate 15*a* disposed at one end of the intermediate transfer assembly 15 directly determines the widthwise position of the secondary transfer assembly 69 (and the widthwise position of the optical sensor 85) with respect to the intermediate transfer assembly 15. In other words, the widthwise position of the secondary transfer assembly 69 with respect to the intermediate transfer assembly 15 is not determined via another member.

The conveyor 60 in the present embodiment includes a unit housing having one side and the other side in the width direction. The other side is illustrated as a left side of the conveyor 60 in FIGS. 8A and 8B. The other side extends in a direction orthogonal to the width direction and the conveyance direction and has a reference surface Bringing the reference surface into contact with a side plate 110 of the body of the image forming apparatus 100 determines a position of the conveyor 60 in the width direction with respect to the image forming apparatus 100 (that is, the side plate 110 of the body). Determining the position of the conveyor 60 in the width direction with respect to the image forming apparatus 100 (that is, the side plate 110 of the body) does not affect determining the position of the secondary transfer assembly 69 with respect to the intermediate transfer assembly 15 directly, because the position of the secondary transfer assembly 69 with respect to the conveyor 60 is not determined, in other words, the secondary transfer assembly is in the floating state with respect to the conveyor 60.

After the conveyor 60 is set in the body of the image forming apparatus 100, a lock mechanism or the like fixes the one side of the conveyor 60 (that is illustrated as a right side of the conveyor 60 in FIG. 8A). Thus, the position of the conveyor 60 in the width direction is determined.

The image forming apparatus 100 in the present embodiment includes a tension spring 65 as a biasing member. The tension spring 65 pulls the secondary transfer assembly 69 in the conveyor 60 set in the body of the image forming apparatus 100 as illustrated in FIG. 8A in a direction that determines the position of the secondary transfer assembly 69 with respect to the intermediate transfer assembly 15 in the width direction, in other words, the leftward direction in FIG. 8A, so that the face plate 69*al* contacts the reference plate 15*a*.

Specifically, the tension spring 65 as the biasing member is connected to the conveyor 60 and the secondary transfer assembly 69. The tension spring 65 has one end (that is the right end of the tension spring 65 in FIG. 8A) and the other end (that is the left end of the tension spring 65 in FIG. 8A). Hooks are attached to both ends of the tension spring 65. The hook attached the one end is connected to the secondary transfer assembly 69, and the hook attached to the other end is connected to the conveyor 60. The tension spring 65 as the biasing member configured as described above biases the secondary transfer assembly 69 that is not fixed to the conveyor 60 set in the body of the image forming apparatus 100 (in other words, the secondary transfer assembly 69 in the upward floating state or the non-held state with respect to the conveyor 60) so that the face plate 69*al* contacts the reference plate 15*a*. As a result, the secondary transfer assembly 69 (and the optical sensor 85) is accurately positioned with respect to the intermediate transfer assembly 15 in the width direction.

With reference to FIGS. 9A and 9B (and FIG. 8A), the intermediate transfer assembly 15 in the present embodiment includes positioning pins 15*b* as positioners. The positioning pins determine the position of the secondary transfer assembly 69 with respect to the intermediate transfer assembly 15 in the conveyance direction (that is, a sub-scanning direction) in the conveyor 60 set in the body of the image forming apparatus 100 (as illustrated in FIG. 8A). In this state, the position of the secondary transfer assembly 69 with respect to the conveyor 60 in the width direction (that is, a main scanning direction) is not determined. Specifically, two positioning pins 15*b* in the present embodiment are located at positions on the reference plate 15*a* (having the reference surface) of the intermediate transfer assembly 15. The positions are separated from each other in the conveyance direction (that is the sub-scanning direction). The two positioning pins 15*b* project from the reference surface at the one end of the intermediate transfer assembly 15 to the outside of the intermediate transfer assembly 15 in the width direction. The face plate 69*al* of the secondary transfer assembly 69 has two positioning holes. The two positioning pins 15*b* of the intermediate transfer assembly 15 are fitted into the two positioning holes, respectively. As illustrated in FIGS. 8A and 8B, the intermediate transfer assembly 15 has positioning holes in a side plate located at the other end of the intermediate transfer assembly 15 in the width direction, and the secondary transfer assembly 69 has positioning pins in a side plate located at the other end of the secondary transfer assembly 69. The positioning pins of the secondary transfer assembly 69 are fitted into the positioning holes of the intermediate transfer assembly 15, respectively. The positioning pins 15*b* as the positioners configured as described above determines the position of the secondary transfer assembly 69 in the conveyance direction (that is the sub-scanning direction) with respect to the intermediate transfer assembly 15 and also brings the secondary transfer assembly 69 into the floating state (in other words, the non-held state) with respect to the conveyor 60. As illustrated in FIG. 8B, pulling out the conveyor 60 in the white arrow direction releases the fit between the secondary transfer assembly 69 and the positioning pins 15*b*, and the secondary transfer assembly 69 falls by its own weight in a direction indicated by the black arrow and is held by the conveyor 60. The configuration of the positioner is not limited to the above. For example, the relationship between the positioning pin 15*b* and the positioning hole in the present embodiment may be reversed, the positioning hole may be formed in the intermediate transfer assembly 15, and the positioning pin may be in the secondary transfer assembly 69.

In addition, the image forming apparatus 100 in the present embodiment is configured so that, when the conveyor 60 including the secondary transfer assembly 69 and being pulled out from the body of the image forming apparatus 100 is set to the body of the image forming apparatus 100, (in other words, when the conveyor 60 illustrated in FIG. 8B is set as illustrated in FIG. 8A,) the position of the conveyor 60 with respect to the body of the image forming apparatus 100 is determined after the position of the secondary transfer assembly 69 with respect to the intermediate transfer assembly 15 is determined, as illustrated in FIGS. 8A and 8B.

Specifically, while the conveyor 60 holding the secondary transfer assembly 69 is pushed into the body of the image forming apparatus 100 as illustrated in FIG. 8B along sliders, the contact surface of the face plate 69*al* of the secondary transfer assembly 69 firstly contacts the reference surface of the reference plate 15*a* of the intermediate transfer assembly 15. Before the contact surface of the face plate 69*al* contacts the reference surface of the reference plate 15*a*, the positioning pins 15*b* of the reference plate 15*a* are fitted into the positioning holes of the face plate 69*al*, which moves the secondary transfer assembly 69 upward in the conveyor 60, that is, sets the secondary transfer assembly 69 to the upward floating state. In this stage, the conveyor 60 does not fix the secondary transfer assembly 69. After the contact surface of the face plate 69*a*1 contacts the reference surface of the reference plate 15*a* to determine the position of the secondary transfer assembly 69 with respect to the intermediate transfer assembly 15, pushing the conveyor 60

(that does not fix the secondary transfer assembly 69) into the body of the image forming apparatus 100 causes the reference surface at the other end of the conveyor 60 to contact the side plate 110 of the body of the image forming apparatus 100 finally, as illustrated in FIG. 8A, to determine the position of the conveyor 60 with respect to the body of the image forming apparatus 100 in the width direction. In order to enable performing the above operations, a widthwise length from a reference surface at the other end of the conveyor 60 to the face plate 69*al*, a widthwise length from the side plate 110 of the body to the reference plate 15*a*, and the like are designed.

As described above, the conveyor 60 in the present embodiment that is set in the body of the image forming apparatus 100 is completely held by the body of the image forming apparatus 100 and becomes a part of the body of the image forming apparatus 100. When the conveyor 60 is set in the body of the image forming apparatus 100, the intermediate transfer assembly 15 holds the secondary transfer assembly 69. In other words, when the conveyor 60 is set in the body of the image forming apparatus 100, the body of the image forming apparatus 100 holds the secondary transfer assembly 69 via the intermediate transfer assembly 15.

The above-described configuration enables smooth transition from a state in which the secondary transfer assembly 69 is on the bottom surface of the conveyor 60 to a state in which the secondary transfer assembly 69 is above the bottom surface of the conveyor 60 and fixed on the intermediate transfer assembly 15 when the conveyor 60 is set in the image forming apparatus 100. Conversely, the above-described configuration enables smooth transition from the state in which the secondary transfer assembly 69 is above the bottom surface of the conveyor 60 and fixed on the intermediate transfer assembly 15 to the state in which the secondary transfer assembly 69 is on the bottom surface of the conveyor 60 when the conveyor 60 is pulled out from the image forming apparatus 100.

As illustrated in FIGS. 6 to 8B, the drive motor 97 in the present embodiment is not held by any of the intermediate transfer assembly 15 and the secondary transfer assembly 69 but is indirectly held by the body of the image forming apparatus 100 so as to rotate the cam 93. Specifically, the drive motor 97 serving as a driving source of the cam 93 of the pressing force adjuster 92 is fixed to the conveyor 60. As a result, the body of the image forming apparatus 100 holds the drive motor 97 via the conveyor 60 (set to the body of the image forming apparatus 100).

As described above, the image forming apparatus 100 (in the present embodiment, the conveyor 60) holds the drive motor 97 to drive the cam 93 disposed in the secondary transfer assembly 69 held by the intermediate transfer assembly 15 in the present embodiment. The secondary transfer assembly 69 or the intermediate transfer assembly 15 does not hold the drive motor 97, which can relatively reduce the load applied to the intermediate transfer assembly 15. That is, the load applied to the intermediate transfer assembly 15 and the secondary transfer assembly 69 in the present embodiment is smaller than a load applied to the intermediate transfer assembly 15 and the secondary transfer assembly 69 that hold the relatively heavy drive motor 97. As a result, disadvantages such as deformation of the intermediate transfer assembly 15 and the secondary transfer assembly 69 due to excessive load are less likely to occur.

Figure 7:
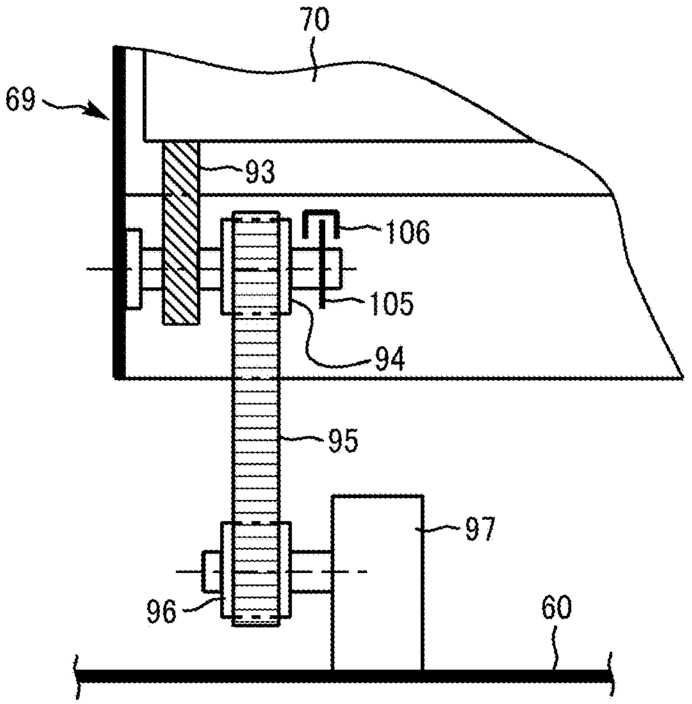
FIG. 7 is a partially enlarged view of one end of the secondary transfer assembly in a width direction of the secondary transfer assembly and parts around the one end.

In the present embodiment, a hybrid stepping motor is used as the drive motor 97 in order to accurately adjust the nip pressure that depends on a rotation amount of the cam 93 in the pressing force adjuster 92. As illustrated in FIG. 7, the pressing force adjuster 92 includes a transmissive photosensor 106 (and a detected plate 105) as a sensor to detect the rotation amount of the cam 93. The detected plate 105 is disposed coaxially with a support shaft (that is, a rotation shaft) of the cam 93. The detected plate 105 has a window as a light transmitting portion and a shield as alight shielding portion. The window or the shield is disposed at a position in a rotation direction of the cam 93. The position of the window or the shield corresponds to a contact position of the cam 93 on the outer circumferential surface of the cam 93 that contacts the unit case 70*a*. The contact position of the cam 93 determines the nip pressure (that is, the secondary transfer nip pressure). The pressing force adjuster 92 sets one of at least two nip pressures that correspond to the windows or the shields. The detected plate 105 is sandwiched by the transmissive photosensor 106 that is fixed and does not rotate. The transmissive photosensor 106 optically detects the window or the shield in the detected plate 105. As a result, the controller 90 obtains the accurate rotation amount of the cam 93. Based on results detected by the transmissive photosensor 106, the controller 90 controls rotation drive of the drive motor 97 (that is, the hybrid stepping motor). As a result, the pressing force adjuster 92 accurately adjusts the nip pressure (that is, the secondary transfer nip pressure).

The image forming apparatus 100 according to the present embodiment includes a transmission that transmits the driving force of the drive motor 97 to the cam 93. Referring to FIG. 7, the transmission includes a drive pulley 96 that is rotationally driven by a drive motor 97, a driven pulley 94 that rotates together with the cam 93, and a timing belt 95 stretched between the drive pulley 96 and the driven pulley 94.

The body of the image forming apparatus 100 holds the drive motor 97 and a part of the transmission (in the present embodiment, the drive pulley 96) via the conveyor 60.

In the present embodiment, the timing belt 95 transmits the driving force of the drive motor 97 disposed on the conveyor 60 to the cam 93 disposed in the secondary transfer assembly 69.

When the conveyor 60 and the secondary transfer assembly 69 are set in the body of the image forming apparatus 100 as illustrated in FIG. 8A, the timing belt 95 is stretched with a predetermined tension between the drive pulley 96 positioned on the motor shaft of the drive motor 97 and the driven pulley 94 positioned on the rotation shaft of the cam 93. As a result, drive transmission is possible. On the other hand, when the conveyor 60 is pulled out from the body of the image forming apparatus 100 as illustrated in FIG. 8B, the secondary transfer assembly 69 moves in the direction indicated by the black arrow (that is, falls) and is placed on the conveyor 60 as described above, which shortens a distance between the axis of the drive pulley 96 positioned on the motor shaft of the drive motor 97 and the axis of the driven pulley 94 positioned on the shaft of the cam 93. As a result, the tension of the timing belt 95 becomes loose.

In other words, using the timing belt 95 in the transmission enables the vertical movement of the secondary transfer assembly 69 with respect to the conveyor 60 caused by the attachment/detachment operation of the conveyor 60 described above with reference to FIGS. 8A and 8B even in the transmission including the drive motor 97 disposed on the conveyor 60 and the cam 93 disposed in the secondary transfer assembly 69.

Preferably, a guide is disposed to maintain the posture of the timing belt 95 so that the timing belt 95 does not fall off in the state illustrated by FIG. 8B (in other words, so that the timing belt 95 is stretched between the pulleys 94 and 96 when the state illustrated in FIG. 8B is changed to the state illustrated in FIG. 8A).

The transmission in the present embodiment includes the timing belt 95 transmitting the driving force of the drive motor 97 disposed on the conveyor 60 to the cam 93 disposed in the secondary transfer assembly 69. However, the transmission may not include the timing belt. For example, the transmission may include a gear train. In this case, the gear train is configured to engage each other after the conveyor 60 is set in the image forming apparatus 100 to position the secondary transfer assembly 69 with respect to the intermediate transfer assembly 15.

As illustrated in FIG. 8A, two cams 93 in the present embodiment are disposed at both ends of the secondary transfer assembly 69 in the width direction that is the lateral direction in FIG. 8A, an axial direction of a rotation axis of the two cams, and the direction orthogonal to the conveyance direction of the sheet P. Two drive motors 97 are disposed to drive and rotate the two cams 93, respectively. That is, the image forming apparatus 100 includes pressing force adjusters disposed at both ends of the secondary transfer assembly 69 to adjust the nip pressure. The pressing force adjusters 92 configured as described above can adjust the pressing force pressing the secondary transfer belt assembly 70 in a well-balanced manner and adjust the nip pressure (that is, the secondary transfer nip pressure) in a well-balanced manner across the width direction.

<First Variation>

Figure 10:
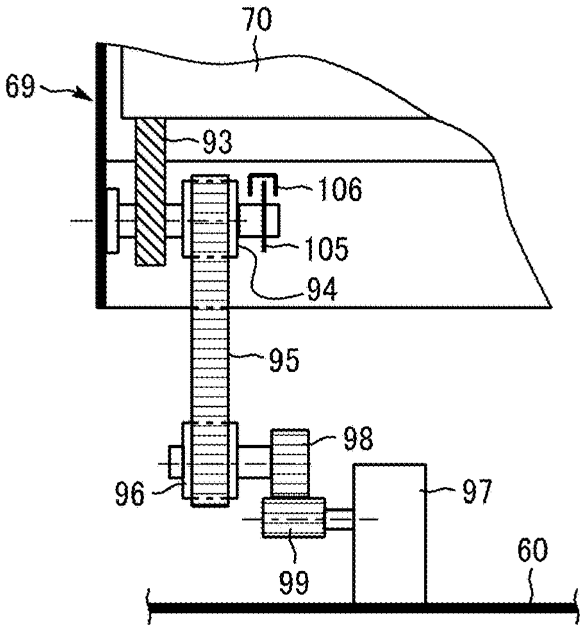
FIG. 10 is a partially enlarged view of one end of the secondary transfer assembly according to a first variation in the width direction of the secondary transfer assembly and parts around the one end.

As illustrated in FIG. 10, the image forming apparatus 100 according to a first variation includes a transmission different from the transmission illustrated in FIG. 7. The transmission transmits the driving force of the drive motor 97 held by the conveyor 60 (in the body of the image forming apparatus 100) to the cam 93 held by the secondary transfer assembly 69. The image forming apparatus 100 according to the first variation has the same configuration as that described with reference to FIGS. 1 to 9 except that the configuration of the transmission. The intermediate transfer assembly 15 holds the secondary transfer assembly 69. As illustrated in FIG. 10, the transmission according to the first variation includes a drive gear 99 mounted on the motor shaft of the drive motor 97, a driven gear 98 meshing with the drive gear 99, the drive pulley 96 mounted on the shaft of the driven gear 98 (As a result, the drive motor 97 drives and rotates the drive pulley 96 via a gear train including the drive gear 99 and the driven gear 98), the driven pulley 94 rotating together with the cam 93, and a timing belt 95 stretched between the drive pulley 96 and the driven pulley 94. In the first variation, the body of the image forming apparatus 100 holds the drive motor 97 and a part of the transmission (in FIG. 10, that is the drive gear 99, the driven gear 98, and the drive pulley 96) via the conveyor 60.

The above-described configuration can reduce the load applied to the intermediate transfer assembly 15.

The transmission is not limited to that illustrated in FIG. 7 or FIG. 10, and other transmissions may be used.

<Second Variation>

Figure 11:
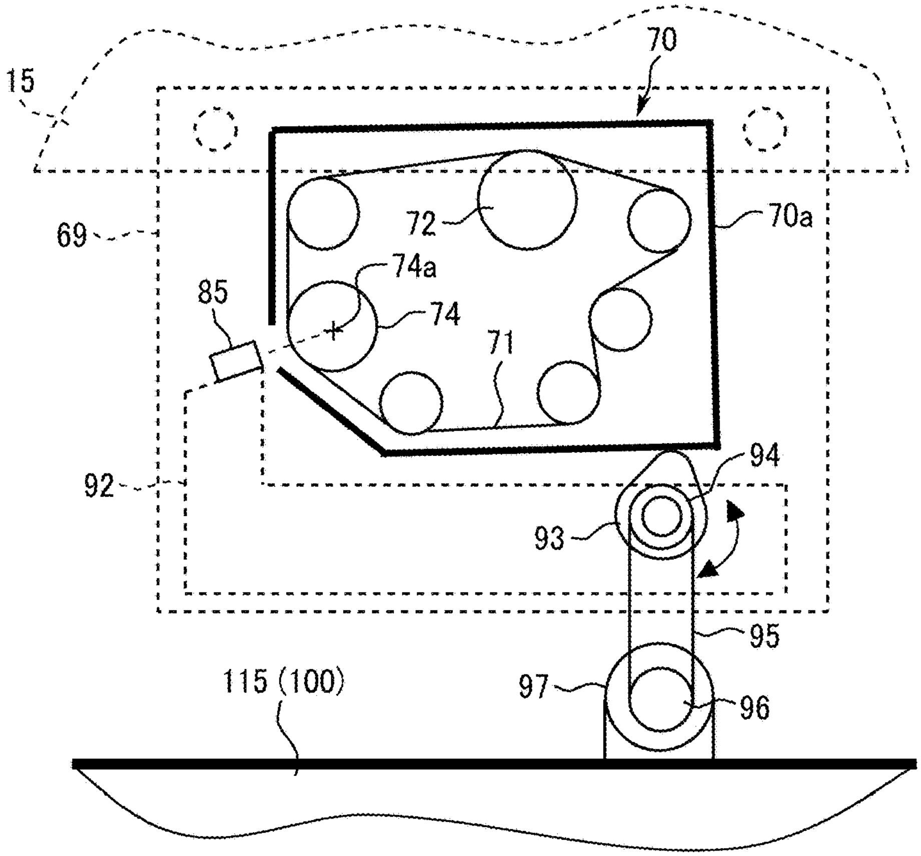
FIG. 11 is a schematic view of a configuration of the secondary transfer assembly according to a second variation and parts around the secondary transfer assembly.

As illustrated in FIG. 11, the drive motor 97 in the image forming apparatus 100 according to the second variation is directly held in the body of the image forming apparatus 100 and rotates the cam 93. The drive motor is not held by the intermediate transfer assembly 15 and the secondary transfer assembly 69. The drive motor 97 in the second variation is not indirectly held by the body of the image forming apparatus 100 via the conveyor 60 as illustrated in FIG. 6 but is directly held by the body of the image forming apparatus 100. The image forming apparatus 100 according to the second variation has the same configuration as that described with reference to FIGS. 1 to 9 except that the body of the image forming apparatus 100 directly holds the drive motor 97, and the intermediate transfer assembly 15 holds the secondary transfer assembly 69.

Specifically, the body of the image forming apparatus 100 includes a main body stay 115 as illustrated in FIG. 11. The main body stay 115 is bridged to the side plates 110 of the body (see FIG. 8A) at both ends of the image forming apparatus 100 in the width direction. The drive motor 97 is fixed and held on the main body stay 115 in the body of the image forming apparatus 100. The above-described configuration can reduce the load applied to the intermediate transfer assembly 15.

As described above, the body of the image forming apparatus 100 according to the present embodiment holds the intermediate transfer assembly 15 including the intermediate transfer belt 8 as the intermediate transferor to which the images formed on the surfaces of the photoconductor drums 1Y, 1M, 1C, and 1K as the image bearers are primarily transferred. In addition, the image forming apparatus 100 includes the secondary transfer belt assembly 70 including the secondary transfer belt 71 as the secondary transferor to secondarily transfer the image on the surface of the intermediate transfer belt 8 to the sheet P conveyed to the secondary transfer nip between the intermediate transfer belt 8 and the secondary transfer belt 71. The image forming apparatus 100 further includes the secondary transfer assembly 69 held by the intermediate transfer assembly 15. The secondary transfer assembly 69 holds the secondary transfer belt assembly 70 that is rotatable. The secondary transfer assembly includes a cam 93 contacting the secondary transfer belt assembly 70 so that the contact pressure of the secondary transfer belt 71 against the intermediate transfer belt 8 can be adjusted. The image forming apparatus 100 further includes the drive motor 97 that is directly or indirectly held by the body of the image forming apparatus 100 so as to rotate the cam 93. The drive motor 97 is not held by any of the intermediate transfer assembly 15 and the secondary transfer assembly 69. The above-described configuration reduces the load applied to the intermediate transfer assembly 15 holding the secondary transfer assembly 69.

The image forming apparatus 100 in the present embodiment employs a repulsive force transfer method and includes the power supply 111 that applies the secondary transfer bias to the secondary transfer backup roller 80. The present disclosure may be applied to an image forming apparatus employing an attraction transfer method in which a power supply applies a secondary transfer bias to the secondary transfer roller 72. In this case, the secondary transfer bias has a polarity opposite to that of the repulsive force transfer method. Further, the present disclosure may also be applied to an image forming apparatus in which the repulsive force transfer method and the attraction transfer method are used in combination. In the above-described embodiments, the image forming apparatus 100 includes the secondary transfer assembly 69 including the secondary transfer belt 71 as the secondary transferor, but the present disclosure is not limited to this. For example, the present disclosure may be applied to the image forming apparatus including the secondary transfer assembly using the secondary transfer roller as the secondary transferor. In the above-described embodiments, the image forming apparatus 100 includes the intermediate transfer assembly 15 including the intermediate transfer belt 8 as the intermediate transferor, but the present disclosure is not limited to this. For example, the present disclosure may be applied to the image forming apparatus including the intermediate transfer assembly using the intermediate transfer drum as the intermediate transferor.

Further, in the above-described embodiments, the present disclosure is applied to the image forming apparatus 100 that forms the color image. Alternatively, the present disclosure may also be applied to an image forming apparatus that forms a monochrome image alone.

The body of the image forming apparatus 100 in the present embodiment holds the drive motor 97 and a part of the transmission (that is, the drive pulley 96) via the conveyor 60 but may hold the drive motor and an entire of the transmission via the conveyor.

The body of the image forming apparatus 100 in the present embodiment directly holds the intermediate transfer assembly 15 but may indirectly hold the intermediate transfer assembly 15 via another member (for example, a slider or the like).

Even in such a case, an advantageous effect equivalent to that of the present embodiment can be obtained.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. The number, position, and shape of the components described above are not limited to those embodiments described above. Desirable number, position, and shape can be determined to perform the present disclosure.

Aspects of the present disclosure are, for example, as follows.

(First Aspect)

In a first aspect, an image forming apparatus includes a body, an intermediate transfer assembly, a secondary transfer assembly, and a drive motor. The intermediate transfer assembly is held by the body and includes an intermediate transferor. The secondary transfer assembly is held by the intermediate transfer assembly and includes a secondary transfer assembly and a cam. The secondary transferor assembly includes a secondary transferor rotatably held by the secondary transfer assembly. The secondary transferor presses the intermediate transferor. The cam contacts the secondary transferor assembly and adjusts a contact pressure of the secondary transferor against the intermediate transferor. The drive motor is held by the body and rotates the cam.

(Second Aspect)

In a second aspect, the image forming apparatus according to the first aspect further includes a transmission to transmit a driving force of the drive motor to the cam.

(Third Aspect)

In a third aspect, the transmission in the image forming apparatus according to the second aspect includes a drive pulley driven and rotated by the drive motor, a driven pulley attached to the cam and configured to rotate the cam, and a timing belt wound around the drive pulley and the driven pulley.

(Fourth Aspect)

In a fourth aspect, the image forming apparatus according to the second aspect or the third aspect further includes a conveyor held by the body. The conveyor conveys a sheet in a conveyance direction. The secondary transfer assembly is detachably attachable to the intermediate transfer assembly. The conveyor holds the secondary transfer assembly detached from the intermediate transfer assembly, is pullable from the body in a width direction orthogonal to the conveyance direction, and holds the drive motor and at least a part of the transmission.

(Fifth Aspect)

In a fifth aspect, the image forming apparatus according to any one of the first to fourth aspects further includes two cams including the cam and two drive motors including the drive motor. The two cams are disposed at both ends of the secondary transfer assembly in an axial direction of a rotation axis of the two cams. The two drive motors drive and rotate the two cams, respectively.

(Sixth Aspect)

In a sixth aspect, the image forming apparatus according to any one of the first to fifth aspects further includes a sensor to detect a rotation amount of the cam and circuitry to control the drive motor based on the rotation amount detected by the sensor.

(Seventh Aspect)

In a seventh aspect, the drive motor in the image forming apparatus according to the sixth aspect is a stepping motor.

(Eighth Aspect)

In an eighth aspect, the image forming apparatus according to any one of the first to seventh aspects includes the secondary transferor assembly including multiple rollers. The multiple rollers include a secondary transfer roller and one roller rotatable around a rotation center of the secondary transferor assembly. The secondary transferor includes a secondary transfer belt stretched around the multiple rollers. The intermediate transferor includes an intermediate transfer belt. The intermediate transferor assembly includes a secondary transfer backup roller to press the secondary transfer roller via the intermediate transfer belt and the secondary transfer belt.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a body;

an intermediate transfer assembly held by the body, the intermediate transfer assembly including an intermediate transferor;

a secondary transfer assembly held by the intermediate transfer assembly, the secondary transfer assembly including:

a secondary transferor assembly including a secondary transferor rotatably held by the secondary transfer assembly, the secondary transferor to press the intermediate transferor; and a cam contacting the secondary transferor assembly, the cam to adjust a contact pressure of the secondary transferor against the intermediate transferor; and a drive motor held by the body and to rotate the cam;

a transmission to transmit a driving force of the drive motor to the cam; and a conveyor held by the body and to convey a sheet in a conveyance direction, wherein the secondary transfer assembly is detachably attachable to the intermediate transfer assembly, and the conveyor is to:

hold the secondary transfer assembly detached from the intermediate transfer assembly;

be pullable from the body in a width direction orthogonal to the conveyance direction; and hold the drive motor and at least a part of the transmission.

2. The image forming apparatus according to claim 1, wherein the transmission includes:

a drive pulley driven and rotated by the drive motor;

a driven pulley attached to the cam and to rotate the cam; and a timing belt wound around the drive pulley and the driven pulley.

3. The image forming apparatus according to claim 1, further comprising:

two cams including the cam, the two cams disposed at both ends of the secondary transfer assembly in an axial direction of a rotation axis of the two cams; and two drive motors including the drive motor, the two drive motors to drive and rotate the two cams, respectively.

4. An image forming apparatus, comprising:

a body;

an intermediate transfer assembly held by the body, the intermediate transfer assembly including an intermediate transferor;

a secondary transfer assembly held by the intermediate transfer assembly, the secondary transfer assembly including:

a secondary transferor assembly including a secondary transferor rotatably held by the secondary transfer assembly, the secondary transferor to press the intermediate transferor; and a cam contacting the secondary transferor assembly, the cam to adjust a contact pressure of the secondary transferor against the intermediate transferor; and a drive motor held by the body and to rotate the cam;

a sensor to detect a rotation amount of the cam; and circuitry to control the drive motor based on the rotation amount detected by the sensor.

5. The image forming apparatus according to claim 4, wherein the drive motor is a stepping motor.

6. The image forming apparatus according to claim 1, wherein the secondary transferor assembly includes:

multiple rollers including:

a secondary transfer roller; and one roller rotatable around a rotation center of the secondary transferor assembly, the secondary transferor includes a secondary transfer belt stretched around the multiple rollers, the intermediate transferor includes an intermediate transfer belt, and the intermediate transfer assembly includes a secondary transfer backup roller configured to press the secondary transfer roller via the intermediate transfer belt and the secondary transfer belt.

7. The image forming apparatus according to claim 4, further comprising:

a transmission to transmit a driving force of the drive motor to the cam.

8. The image forming apparatus according to claim 7, wherein the transmission includes:

a drive pulley driven and rotated by the drive motor;

a driven pulley attached to the cam and to rotate the cam; and a timing belt wound around the drive pulley and the driven pulley.

9. The image forming apparatus according to claim 7, further comprising:

a conveyor held by the body and to convey a sheet in a conveyance direction, wherein the secondary transfer assembly is detachably attachable to the intermediate transfer assembly, and the conveyor is to:

hold the secondary transfer assembly detached from the intermediate transfer assembly;

be pullable from the body in a width direction orthogonal to the conveyance direction; and hold the drive motor and at least a part of the transmission.

10. The image forming apparatus according to claim 4, further comprising:

two cams including the cam, the two cams disposed at both ends of the secondary transfer assembly in an axial direction of a rotation axis of the two cams; and two drive motors including the drive motor, the two drive motors to drive and rotate the two cams, respectively.

11. The image forming apparatus according to claim 4, wherein the secondary transferor assembly includes:

multiple rollers including:

a secondary transfer roller; and one roller rotatable around a rotation center of the secondary transferor assembly, the secondary transferor includes a secondary transfer belt stretched around the multiple rollers, the intermediate transferor includes an intermediate transfer belt, and the intermediate transfer assembly includes a secondary transfer backup roller to press the secondary transfer roller via the intermediate transfer belt and the secondary transfer belt.

* * * * *